United States Patent
Salter et al.

(10) Patent No.: US 10,131,273 B2
(45) Date of Patent: Nov. 20, 2018

(54) LIGHTING MODULE FOR A MOTOR VEHICLE

(71) Applicant: FORD GLOBAL TECHNOLOGIES, LLC, Dearborn, MI (US)

(72) Inventors: Stuart C. Salter, White Lakes, MI (US); Cornel Lewis Gardner, Romulus, MI (US); Paul Kenneth Dellock, Northville, MI (US); Thomas F. Boettger, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 15/184,696

(22) Filed: Jun. 16, 2016

(65) Prior Publication Data

US 2017/0361760 A1    Dec. 21, 2017

(51) Int. Cl.
| | |
|---|---|
| *B60Q 1/26* | (2006.01) |
| *B60Q 3/16* | (2017.01) |
| *B60Q 1/34* | (2006.01) |
| *B60Q 1/50* | (2006.01) |
| *F21S 43/13* | (2018.01) |
| *F21S 43/237* | (2018.01) |
| *F21S 43/249* | (2018.01) |

(52) U.S. Cl.
CPC ............ *B60Q 1/2607* (2013.01); *B60Q 1/34* (2013.01); *B60Q 1/50* (2013.01); *B60Q 3/16* (2017.02); *F21S 43/13* (2018.01); *F21S 43/237* (2018.01); *F21S 43/249* (2018.01)

(58) Field of Classification Search
CPC .. E05B 17/10; B60Q 3/02; B60Q 3/20; B60Q 1/2607; B60Q 3/16; B60Q 1/34; B60Q 1/50; F21S 43/237; F21S 43/249; F21S 43/13; F21V 9/30; F21V 9/32; F21V 9/38
See application file for complete search history.

(56) References Cited

U.S. PATENT DOCUMENTS

| | | |
|---|---|---|
| 4,494,326 A | 1/1985 | Kanamori |
| 5,698,906 A | 12/1997 | Gardner et al. |
| 6,986,581 B2 | 1/2006 | Sun et al. |
| 8,466,438 B2 | 6/2013 | Lambert et al. |
| 8,477,401 B1 | 7/2013 | Kuhlman et al. |
| 8,506,143 B2 | 8/2013 | Sugiura et al. |
| 8,519,362 B2 | 8/2013 | Labrot et al. |
| 8,683,722 B1 | 4/2014 | Cowan |

(Continued)

FOREIGN PATENT DOCUMENTS

| | | |
|---|---|---|
| CN | 101480937 A | 7/2009 |
| DE | 4104119 A1 | 8/1992 |
| WO | 2007028955 A1 | 3/2007 |

OTHER PUBLICATIONS

English Machine Translation of CN101480937A.
English Machine Translation of DE4104119A1.

*Primary Examiner* — Bao Q Truong
(74) *Attorney, Agent, or Firm* — Vichit Chea; King & Schickli, PLLC

(57) ABSTRACT

A lighting module for a motor vehicle includes a carrier, such as a single printed circuit board, and a plurality of light sources configured to perform various functions selected from a group including door lock status, turn signal indication, blind spot warning indication and door latch handle illumination.

17 Claims, 7 Drawing Sheets

(56) References Cited

U.S. PATENT DOCUMENTS

| | | | |
|---|---|---|---|
| 2004/0114384 A1* | 6/2004 | Carter | B60Q 1/2665 |
| | | | 362/494 |
| 2010/0253493 A1 | 10/2010 | Szczerba et al. | |
| 2010/0253593 A1 | 10/2010 | Seder et al. | |
| 2010/0253597 A1 | 10/2010 | Seder et al. | |
| 2010/0253598 A1 | 10/2010 | Szczerba et al. | |
| 2010/0253602 A1 | 10/2010 | Szczerba et al. | |
| 2010/0253918 A1 | 10/2010 | Seder et al. | |
| 2011/0260848 A1* | 10/2011 | Rodriguez Barros | |
| | | | B60Q 1/2665 |
| | | | 340/438 |
| 2012/0089273 A1 | 4/2012 | Seder et al. | |
| 2012/0112900 A1* | 5/2012 | Garofalo | B60Q 1/50 |
| | | | 340/468 |
| 2012/0274458 A1 | 11/2012 | Wagner | |
| 2013/0027976 A1* | 1/2013 | Robbins | F21K 9/00 |
| | | | 362/612 |
| 2013/0128601 A1* | 5/2013 | Kim | B60Q 1/2607 |
| | | | 362/511 |
| 2014/0002255 A1 | 1/2014 | Reuschel et al. | |
| 2014/0003072 A1 | 1/2014 | Yamamoto et al. | |
| 2014/0003075 A1 | 1/2014 | Yamada et al. | |
| 2014/0240997 A1 | 8/2014 | Massault et al. | |
| 2015/0035308 A1* | 2/2015 | Huebner | B60R 7/04 |
| | | | 296/37.8 |
| 2015/0138797 A1* | 5/2015 | Salter | B60Q 9/00 |
| | | | 362/510 |
| 2015/0138803 A1* | 5/2015 | Salter | B60Q 1/2661 |
| | | | 362/510 |
| 2015/0138820 A1* | 5/2015 | Salter | F21V 9/16 |
| | | | 362/510 |
| 2015/0375673 A1 | 12/2015 | Testal et al. | |
| 2016/0349433 A1 | 12/2016 | Donahue | |
| 2017/0210282 A1* | 7/2017 | Rodriguez Barros | B60Q 1/323 |

* cited by examiner

LIGHTING MODULE FOR A MOTOR VEHICLE

TECHNICAL FIELD

This document relates generally to the motor vehicle equipment field and, more particularly, to a device for indicating lock status of a motor vehicle door.

BACKGROUND

Printed circuit boards and interconnect network connectors can add significantly to the production and assembly costs for a motor vehicle.

This document relates to a new and improved lighting module wherein a plurality of light sources are provided on a single carrier or printed circuit board and configured to perform a number of different functions. That single carrier/printed circuit board requires only one interconnect network thereby effectively reducing both production and assembly costs.

SUMMARY

In accordance with the purposes and benefits described herein, a lighting module is provided for a motor vehicle. That lighting module includes a carrier and a plurality of light sources carried on that carrier and configured to indicate door lock status and illuminate a door latch handle.

The carrier may comprise a printed circuit board with an interconnect network. The plurality of light sources may be configured to illuminate a turn signal indicator, a blind spot indicator or both a turn signal indicator and a blind spot indicator.

Thus, the plurality of light sources may include (a) a first light source configured to emit a first excitation light onto a first luminescent marker indicating a locked door lock status and (b) a second light source configured to emit a second excitation light onto a second luminescent marker indicating an unlocked door lock status.

The first light source may be selected from a group consisting of an ultraviolet or UV light source and an infrared or IR light source. The second light source may be selected from a group consisting of a UV light source and an IR light source. Thus, the first and second light sources may both be UV light sources. The first and second light sources may both be IR light sources. The first light source may be a UV light source while the second light source may be an IR light source. The first light source may be an IR light source while the second light source is a UV light source.

The plurality of light sources may also include a third light source for emitting visible light directed upon a door latch handle used to unlatch and open a motor vehicle door. Further, the plurality of light sources may also include a fourth light source configured to emit a third excitation light onto a luminescent turn signal indicator. Still further, the plurality of light sources may also include a fifth light source configured to emit a fourth excitation light onto a luminescent blind spot indicator when another motor vehicle is positioned in an adjacent lane of a roadway in the mirror blind spot of the motor vehicle operator.

The fourth light source may be selected from a group consisting of a UV light source and an IR light source. The fifth light source may be selected from a group consisting of a UV light source and an IR light source. Thus, the fourth and fifth light sources may both be UV light sources or both be IR light sources. Alternatively, the fourth light source may be a UV light source while the fifth light source is an IR light source. Still further, the fourth light source may be an IR light source while the fifth light source is a UV light source.

In accordance with still another aspect, the lighting module may be described as comprising a carrier and a plurality of light sources configured to indicate a turn signal indicator and a blind spot warning. Thus, the plurality of light sources may include a turn signal indicator light source and a blind spot indicator light source. Either of these light sources may be an IR light source or a UV light source.

In the following description, there are shown and described several preferred embodiments of the lighting module. As it should be realized, the lighting module is capable of other, different embodiments and its several details are capable of modification in various, obvious aspects all without departing from the device as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the lighting module and together with the description serve to explain certain principles thereof. In the drawing figures.

Reference will now be made in detail to the present preferred embodiments of the device, examples of which are illustrated in the accompanying drawing figures.

DETAILED DESCRIPTION

Figure 1:
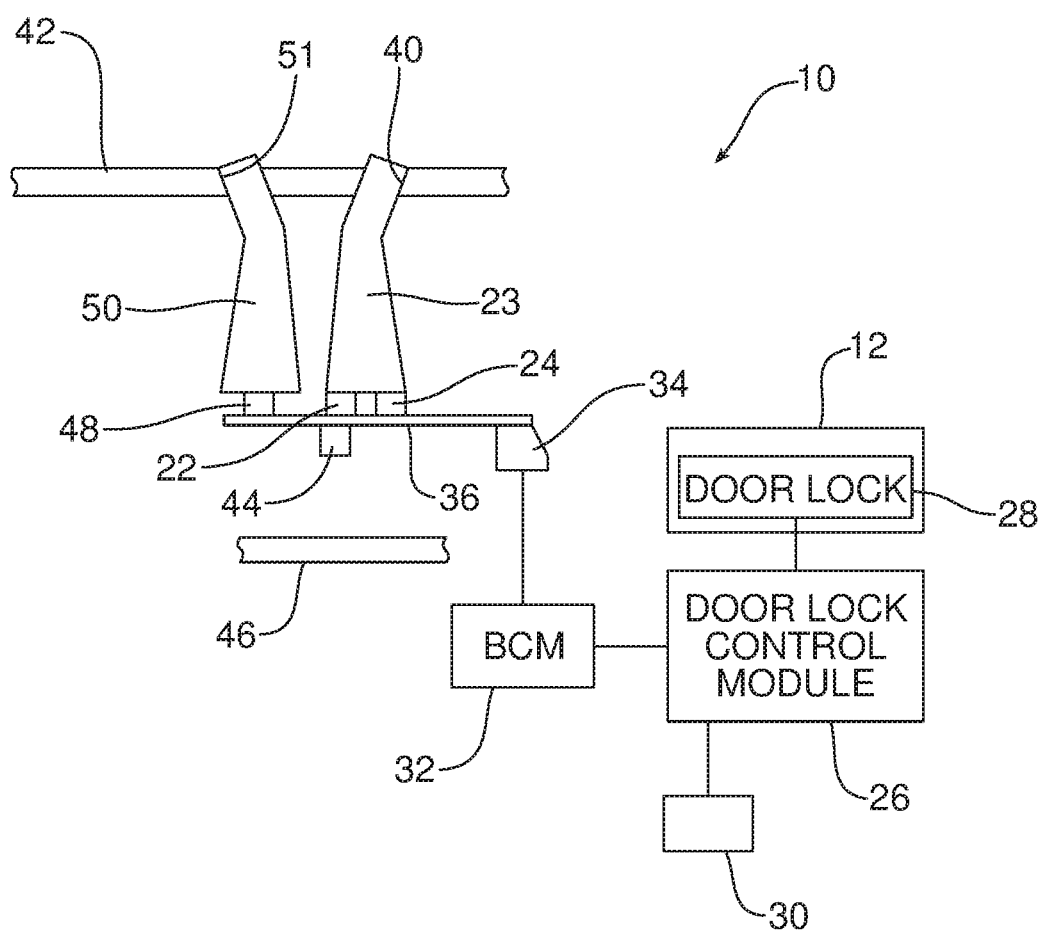
FIG. 1 is a schematic block diagram of a first embodiment of the device for indicating lock status of a motor vehicle door.
Figure 2:
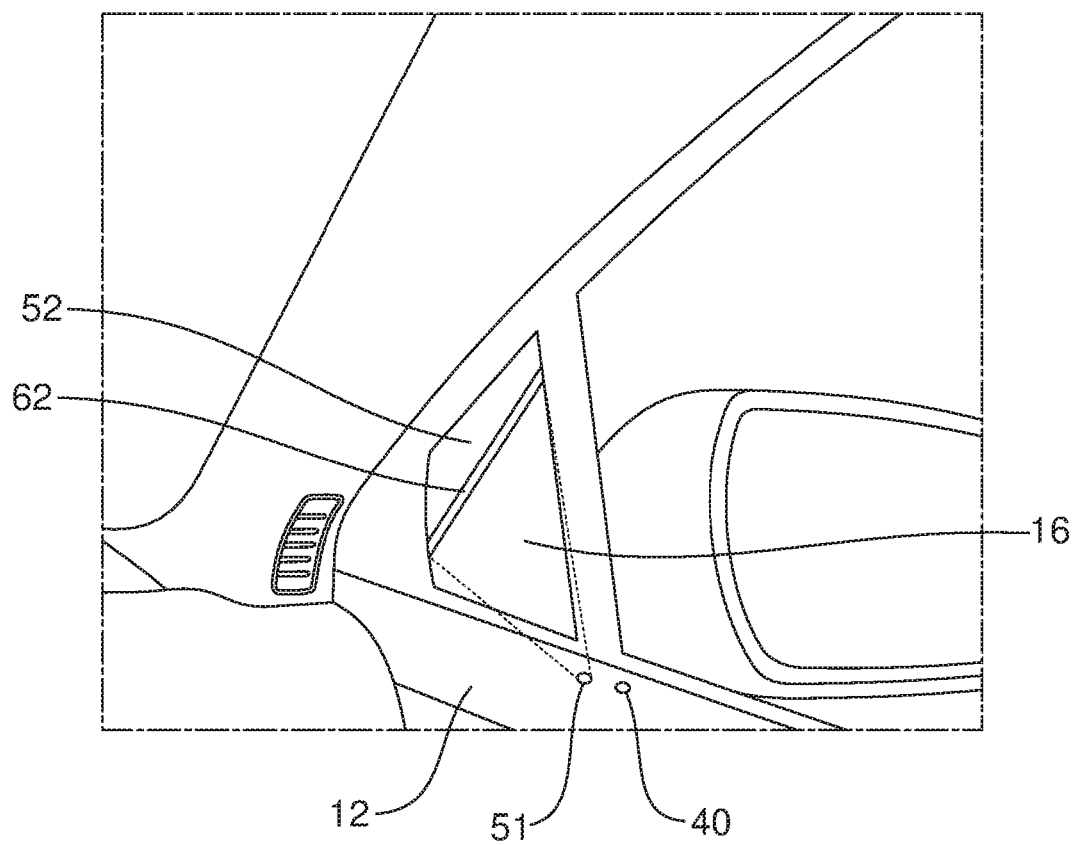
FIG. 2 illustrates the device functioning to indicate a turn signal on a motor vehicle window.
Figure 3A:
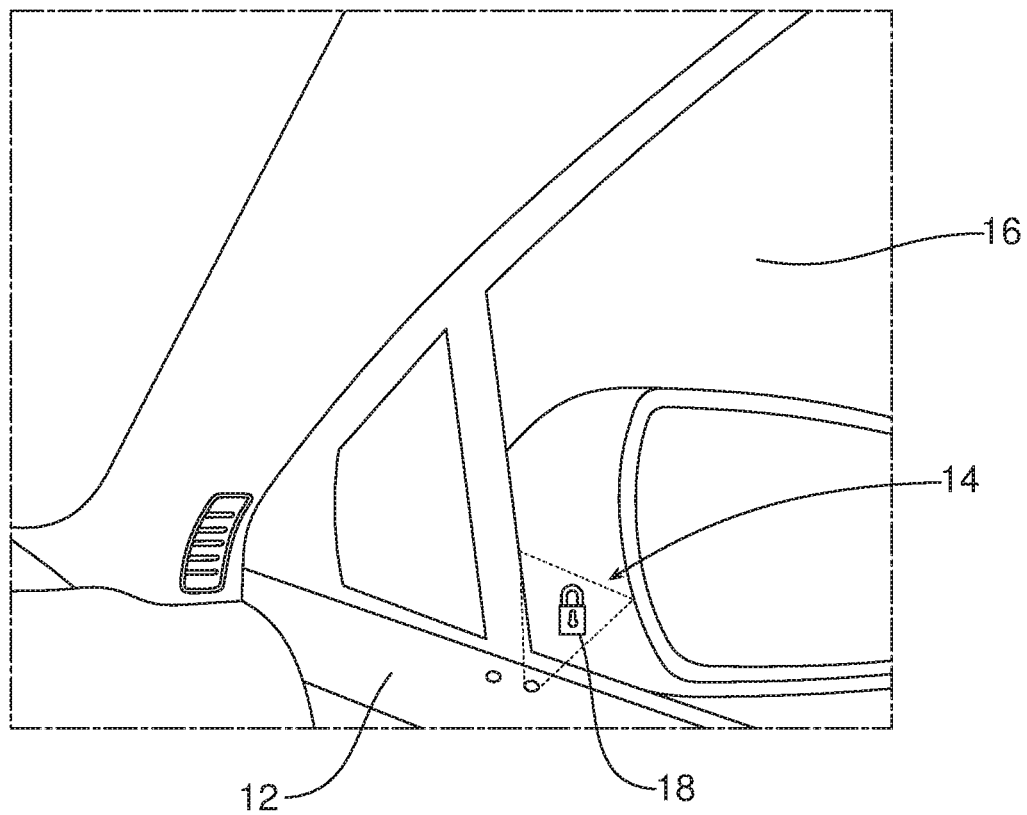
FIG. 3a is a view similar to FIG. 2 but illustrating how the device may function to indicate on the window that the motor vehicle door is in a locked state.
Figure 3B:
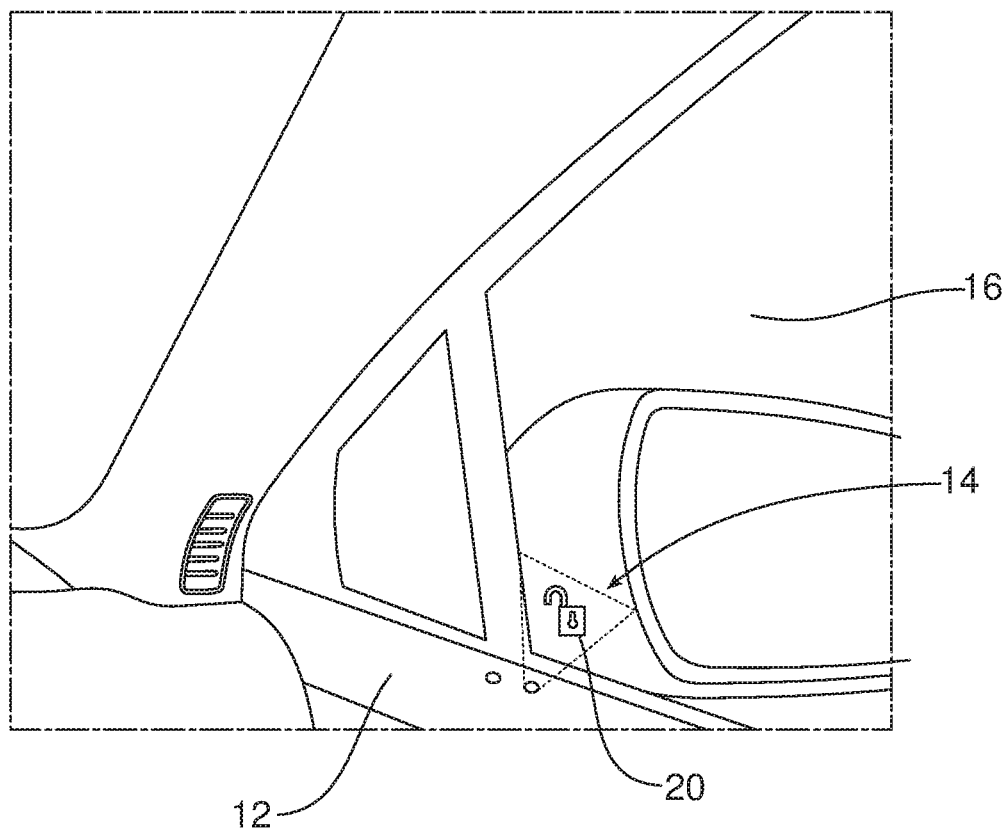
FIG. 3b is a view similar to FIG. 3a illustrating how the device may function to indicate on the window that the motor vehicle door is in an unlocked state.

Reference is now made to FIGS. 1-3b which illustrate a device 10 for indicating the lock status of a motor vehicle door. As best illustrated in FIGS. 3a and 3b, the device 10 includes a door lock status indicator, generally designated by reference numeral 14 that is carried on the window 16 of the motor vehicle door. In the illustrated embodiment, the door lock status indicator 14 comprises a first luminescent marker 18 in the form of a locked lock icon and a second luminescent marker 20 in the form of an unlocked lock icon.

The first luminescent marker 18 and second luminescent marker 20 may comprise inks that are invisible when subjected to visible light. However, when subjected to excitation light in either the ultraviolet or infrared spectrum, the luminescent markers 18, 20 change to a visible state. Here it should be appreciated that the markers 18, 20 return to the invisible state when the excitation light is removed or extinguished. In one possible embodiment, the luminescent ink may be placed directly on the window 16. Such an ink marker 18, 20 may then be covered with a clear film or coating to protect it. In another possible embodiment, the luminescent ink may be on a film which includes a peel and stick adhesive to affix the film to the window 16.

In the embodiment illustrated in FIG. 1, the first luminescent marker 18 changes from the invisible state to the visible state when subjected to excitation light in the UV wavelength band while the second luminescent marker 20 changes from the invisible state to the visible state while subjected to excitation light in the IR wavelength band.

As best illustrated in FIG. 1, the device 10 further includes a first light source 22 configured to project UV excitation light through the light pipe 23 upon the first luminescent marker 18 in order to change the first luminescent marker from the invisible state to the visible state when the status of the door lock changes from an unlocked condition to a locked condition. The first light source 22 is activated and the first luminescent marker 18 remains in the visible state for a predetermined period of time. The first light source 22 is then deactivated and the first luminescent marker 18 returns to the invisible state.

Further, the device includes a second light source 24 configured to project IR excitation light through the light pipe 23 upon the second luminescent marker 20 in order to change the second luminescent marker from the invisible state to the visible state when the door lock status of the motor vehicle door changes from the locked condition to the unlocked condition. Similarly, the second light source 24 is activated and the second luminescent marker 20 remains in the visible state for a predetermined period of time. The second light source 24 is then deactivated and the second luminescent marker 18 returns to the invisible state.

More specifically, in the illustrated embodiment, a door lock control module 26 controls the door lock 28 of the motor vehicle door 12. The door lock control module 26 incorporates a controller, in the form of a dedicated microprocessor or electronic control unit (ECU) operating in accordance with appropriate instructions from control software. The door lock control module 26 functions to lock or unlock the door lock 28 in response to a door lock actuator 30, such as a door lock button on a door or console of the motor vehicle or a key fob coded to the motor vehicle.

Whenever an actuator 30 is depressed, the door lock control module 26 will make an appropriate change in the door lock status of the door lock 28 and communicate that change to the body control module or BCM 32. As is known in the art, the BCM 32 may comprise a computing device having one or more processors, one or more memories, one or more network interfaces, a human interface, a global positioning satellite or GPS/geolocator component, a display device such as a multifunction display with touch screen capability and a speech processor that all communicate with each other over a communication bus. The BCM 32 performs a number of interior body electrically-based functions including, for example, interior locking, remote key entry, interior lighting, exterior lighting, windshield wiper control and the like. In some embodiments, the BCM 32 may also function to control entertainment functions (e.g. radio, CD player and communications such as telephone and internet communications over a wireless network). In some embodiments, the BCM 32 may be connected by a communication bus to other control modules that provide one or more of these additional functions.

Upon receiving either a door "locked" signal or a door "unlocked" signal from the door lock control module 26, the BCM 32 sends an appropriate control signal through the wiring harness connector 34 on the carrier or printed circuit board 36 upon which the first and second light sources 22, 24 are carried. That wiring harness connector 34 includes a network such as a local interconnected network (LIN) or controller area network (CAN) which allows the BCM 32 to communicate with the drivers of the first and second light sources 22, 24 so that they may be activated on command of the BCM.

In the event the BCM 32 receives a locked signal from the door lock control module 26, the BCM commands the activation of the first light source 22. That first light source 22 then emits UV excitation light that is directed by the light pipe 23 through an aperture 40 in the door trim 42 upon the first luminescent marker 18 on the window 16. As illustrated in FIG. 3a, that first luminescent marker 18 then becomes visible so that the locked lock icon may be easily seen from the exterior or interior of the motor vehicle.

In contrast, if the BCM 32 receives an unlocked lock signal from the door lock control module 26, the BCM sends a command signal activating the second light source 24 which emits an IR excitation light through the light pipe 23 which is directed onto the second luminescent marker 20 thereby causing the second luminescent marker to become visible so that the unlocked lock icon is clearly visible from the interior or exterior of the motor vehicle. Here it should be appreciated that the appropriate luminescent marker 18/20 or icon is only displayed for a predetermined period of time following a change in door lock status. Once that time is timed out, the light source 22 or 24 is deactivated and the luminescent marker 18 or 20 returns to its invisible state.

As further illustrated in FIG. 1, the device 10 may also include a visible light source 44 that may be activated by the BCM 32 as desired to direct visible light onto the adjacent door latch handle 46 for opening and closing the motor vehicle door 12.

As also illustrated in FIGS. 1 and 2, the device 10 may include still another light source 48, responsive to control signals or commands from the BCM 32 or the turn signal control stalk on the steering column (not shown). When activated the light source 48 emits an excitation light through the light pipe 50 and the aperture 51 in the door trim 42 onto a luminescent turn signal indicator 52 that may be provided on the motor vehicle door window 16 adjacent the A pillar 54. Where the turn signal indicator 52 comprises a UV responsive ink, the light source 48 emits excitation light in the UV band so that the turn signal indicator 52 becomes visible. In contrast, where the turn signal indicator 52 is responsive to excitation light in the IR band, the light source 48 emits excitation light in the IR band. As should be appreciated, the light source 48 is flashed like a turn indicator so that the turn signal indicator 52 on the window 16 changes repeatedly between the visible and invisible state until the turn signal is cancelled by the BCM 32. Advantageously, the turn signal indicator 52 is very visible from the exterior of the motor vehicle and may actually replace more expensive turn signal light assemblies such as the type presently provided on the exterior mirrors of a motor vehicle.

Where the turn signal indicator 52 is provided at the position shown on the window 16 adjacent the A pillar 54 and in front of the window stop, the geometry allows the projection of very high light levels from the light source 48 without any reflection back to the vehicle occupants. At the same time, the turn signal indicator 52 is clearly visible from the interior and exterior of the motor vehicle.

Figure 4:
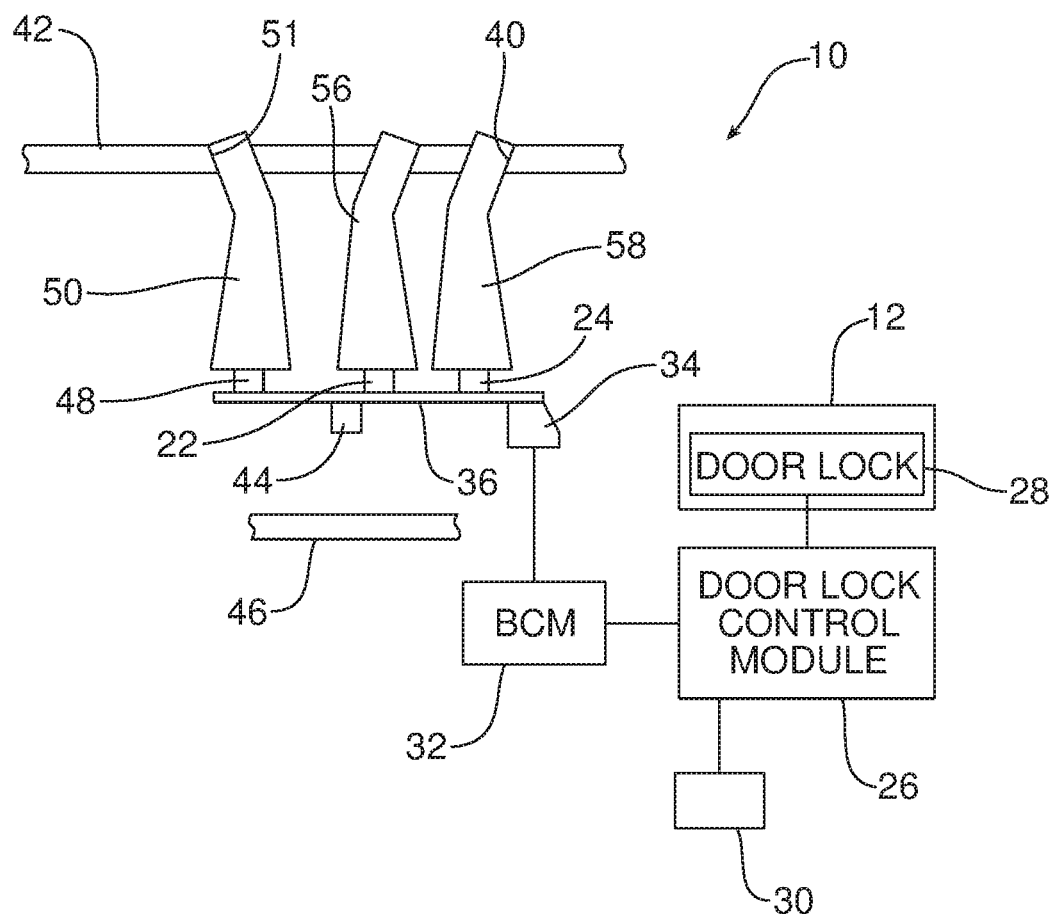
FIG. 4 is a schematic block diagram of an alternative embodiment of the device.

Reference is now made to FIG. 4 illustrating an alternative embodiment of the device 10. That alternative embodiment of the device 10 is very similar to the embodiment illustrated in FIG. 1 and like structures include identical reference numbers. Since those like structures operate in the same manner as described above with respect to the FIG. 1 embodiment, they will not be described again with regard to the second embodiment for the sake of brevity.

While the first embodiment includes a single light pipe 38 for directing light from the first and second light sources 22, 24 onto the first and second luminescent markers 18, 20 this second embodiment of the device 10 includes a separate light pipe 56 for the first light source 22 and a second light pipe 58 for the second light source 24. As should be appreciated, the light pipes 56, 58 direct the light from the two sources 22, 24 to different points on the motor vehicle door window 16 where the respective first and second luminescent markers/icons 18, 20 are provided. While the first embodiment of the device 10 illustrated in FIG. 1 requires the first light source 22 and the first luminescent marker 18 to function in one of the UV or IR band and the second light source 24 and the second luminescent marker 20 to function in the other, the first and second light sources 22, 24 in the second embodiment of the device 10 may function in the same band, be it UV or IR. This is possible since the light from the light sources is directed to different points on the window 16 where the luminescent markers 18, 20 are provided. Accordingly, only the appropriate luminescent marker/icon 18, 20 is made visible when there is a change in door lock status despite the fact that both icons/markers are responsive to excitation light of the same spectrum.

Figure 5:
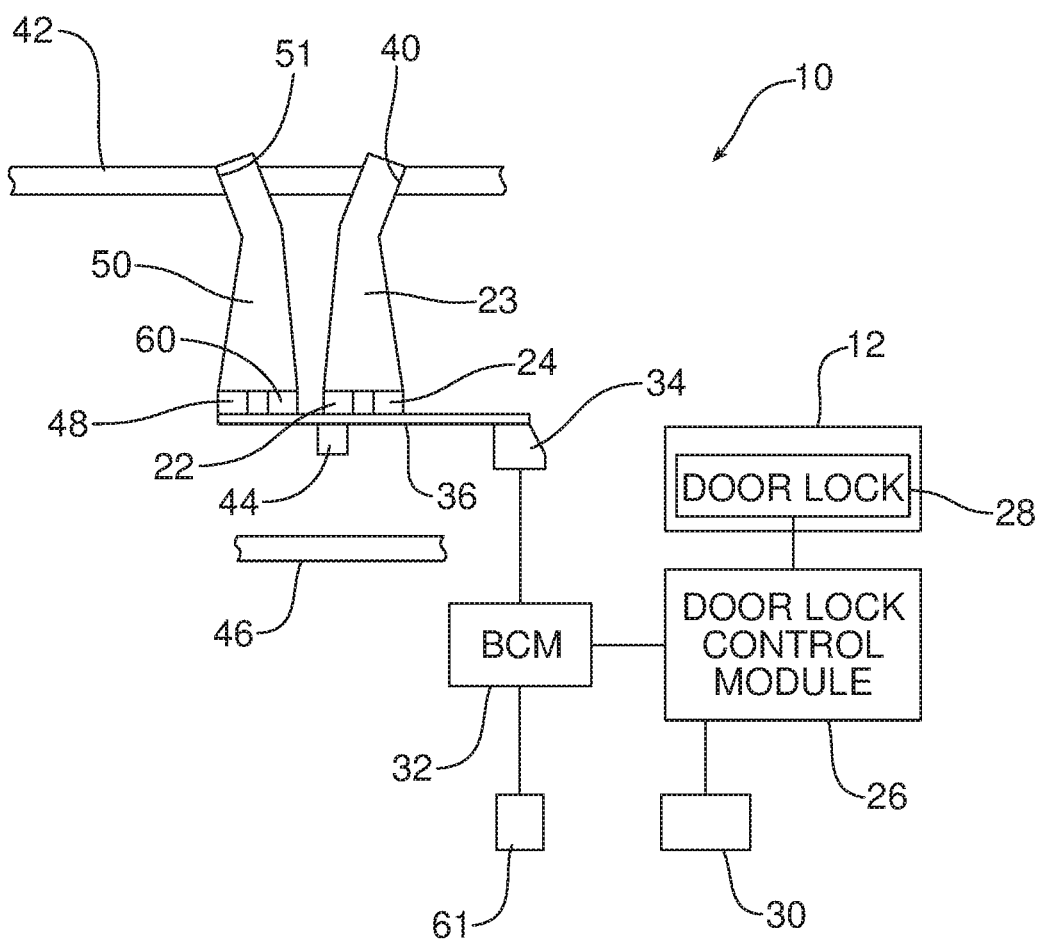
FIG. 5 is a schematic block diagram of yet another alternative embodiment of the device.

Reference is now made to FIG. 5 illustrating yet another embodiment of the device 10. The embodiment of device 10 illustrated in FIG. 5 is identical to the device 10 illustrated in FIG. 1 except that it includes a fifth light source 60 coupled to the light pipe 50, a blind spot sensor 61 connected to the BCM 32 and a luminescent blind spot indicator 62 on the window 16 (see also FIG. 2).

When the BCM 32 receives a signal from the sensor 61 indicating that an obstacle, such as another motor vehicle, is in an adjacent lane of a roadway in the blind spot of the vehicle operator, the BCM sends a control signal or command to activate the light source 60. That light source 60 then emits an excitation light through the light pipe 50 and the aperture 51 in the door trim 42 onto a luminescent blind spot indicator 62 (see FIG. 2) which visually warns the driver of the obstacle. The luminescent blind spot indicator 62 may be provided on the motor vehicle window 16 adjacent the A-pillar 54 similar to the luminescent turn signal indicator 52.

Where the luminescent turn signal indicator 52 comprises a UV responsive ink and the light source 48 comprises a UV light source, the luminescent blind spot indicator 62 comprises an IR responsive ink and the light source 60 comprises an IR light source. Alternatively, where the turn signal indicator 52 and light source 48 are IR based, the blind spot indicator 62 and light source 60 are UV based. In this way it is possible to provide distinct turn signal and blind spot indication through a single light pipe 50.

Figure 6:
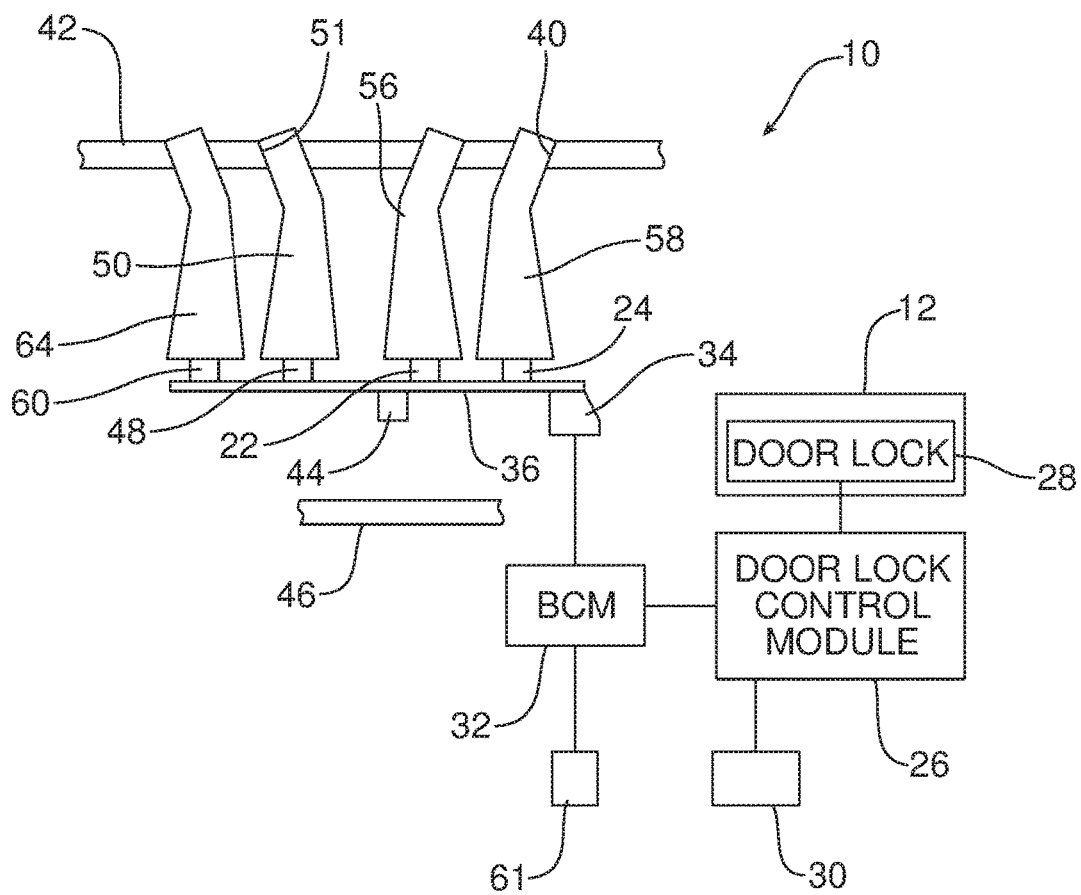
FIG. 6 is a schematic diagram of still another alternative embodiment of the device.

Reference is now made to FIG. 6 illustrating yet another alternative embodiment of the device 10. The FIG. 6 embodiment of the device 10 is very similar to that illustrated in FIG. 4 except that the FIG. 6 device includes a blind spot indicator feature including a blind spot sensor 61 connected to the BCM 32, a fifth light source 60, an additional light pipe 64 and the luminescent blind spot indicator 62 on the window 16.

When the BCM 32 receives a signal from the sensor 61 indicating a motor vehicle is in an adjacent lane of the roadway within the blind spot of the vehicle operator, the BCM sends a control signal or command to activate the light source 60. The light source 60 then emits an excitation light in the proper band through the light pipe 64 which directs that excitation light onto the luminescent blind spot indicator 62 on the window 16 (see FIG. 2). The indicator 62 then luminesces to provide a visual warning to the operator indicating the presence of the other motor vehicle in the blind spot.

In any of the embodiments incorporating the luminescent blind spot indicator 62, it should be appreciated that it is particularly advantageous to position that indicator on the window in the driver's sight path to the associated exterior side mirror where the warning indication will be easily seen when the driver is using that mirror to confirm space to change lanes in the motor vehicle.

As should be appreciated, the devices 10 described above may be effectively provided as a lighting module with all of the light sources 22, 24, 44, 48 and 60 being carried on the same carrier or printed circuit board 36 including the wire harness connector with the network 34. Such a combined lighting module or device 10 is less expensive to manufacture and assemble into a motor vehicle door 12 than if individual modules were provided for each light function (i.e. lighting of the door handle, presentation of the turn signal, presentation of the blind spot indicator and lighting of the door locked and door unlocked luminescent markers/icons 18, 20). While all five light sources 22, 24, 44, 48 and 60 are illustrated on the same printed circuit board 36 in the embodiments illustrated in FIGS. 5 and 6, it should be appreciated that any combination of two, three or four of the light sources may be provided on the same printed circuit board as desired to meet the needs of any particular motor vehicle application.

Further, it should be appreciated that the utilization of light sources 48 and 60 mounted on a printed circuit board 36 isolated in the motor vehicle door 12 from the weather in order to excite easily seen luminescent turn signal and blind spot warning indicators 52, 62 on the window 16 is a simpler and less expensive solution than the provision of light sources for these purposes in the exterior side mirrors where isolation of those light sources from inclement weather is difficult to achieve.

The foregoing has been presented for purposes of illustration and description. It is not intended to be exhaustive or to limit the embodiments to the precise form disclosed. Obvious modifications and variations are possible in light of the above teachings. For example, the luminescent markers 18, 20 could be made with a visible phosphor/dye on the window 16. All such modifications and variations are within the scope of the appended claims when interpreted in accordance with the breadth to which they are fairly, legally and equitably entitled.

What is claimed:

1. A lighting module for a motor vehicle, comprising:
   a carrier; and
   a plurality of light sources carried on said carrier, wherein said plurality of light sources include (a) a first light source emitting a first excitation light onto a first luminescent marker indicating a locked door lock status, (b) a second light source emitting a second excitation light onto a second luminescent marker indicating an unlocked door lock status and (c) a third light source for emitting visible light directed upon a door latch handle.

2. The lighting module of claim 1 wherein said plurality of light sources carried on said carrier further illuminate a turn signal indicator.

3. The lighting module of claim 2 wherein said plurality of light sources carried on said carrier further illuminate a blind spot indicator.

4. The lighting module of claim 3 wherein said carrier is a printed circuit board with an interconnect network.

5. The lighting module of claim 1 wherein said first light source is selected from a first group consisting of a UV light source and an IR light source.

6. The lighting module of claim 5, wherein said second light source is selected from a second group consisting of a UV light source and an IR light source.

7. The lighting module of claim 6 wherein said first light source is a UV light source and said second light source is an IR light source.

8. The lighting module of claim 6 wherein said first light source is said IR light source and said second light source is said UV light source.

9. The lighting module of claim 1, further including a fourth light source emitting a third excitation light onto a luminescent turn signal indicator.

10. The lighting module of claim 9, further including a fifth light source emitting a fourth excitation light onto a luminescent blind spot indicator.

11. The lighting module of claim 10 wherein said fourth light source is selected from a group consisting of a UV light source and an IR light source.

12. The lighting module of claim 11 wherein said fifth light source is selected from a group consisting of a UV light source and an IR light source.

13. The lighting module of claim 12 wherein said fourth light source is said UV light source and said fifth light source is said IR light source.

14. The lighting module of claim 12 wherein said fourth light source is said IR light source and said fifth light source is said UV light source.

15. A lighting module for a motor vehicle, comprising:
a carrier; and
a plurality of light sources carried on said carrier, wherein said plurality of light sources includes a turn signal indicator light source and a blind spot indicator light source.

16. The lighting module of claim 15 wherein said turn signal indicator light source is selected from a first group of light sources consisting of a UV light source and an IR light source.

17. The lighting module of claim 16 wherein said blind spot indicator light source is selected from a second group of light sources including a UV light source and an IR light source.

* * * * *